INVENTORS.
JOHN F. BROWN
LELAND O. HUGHES
BY
ATTORNEY

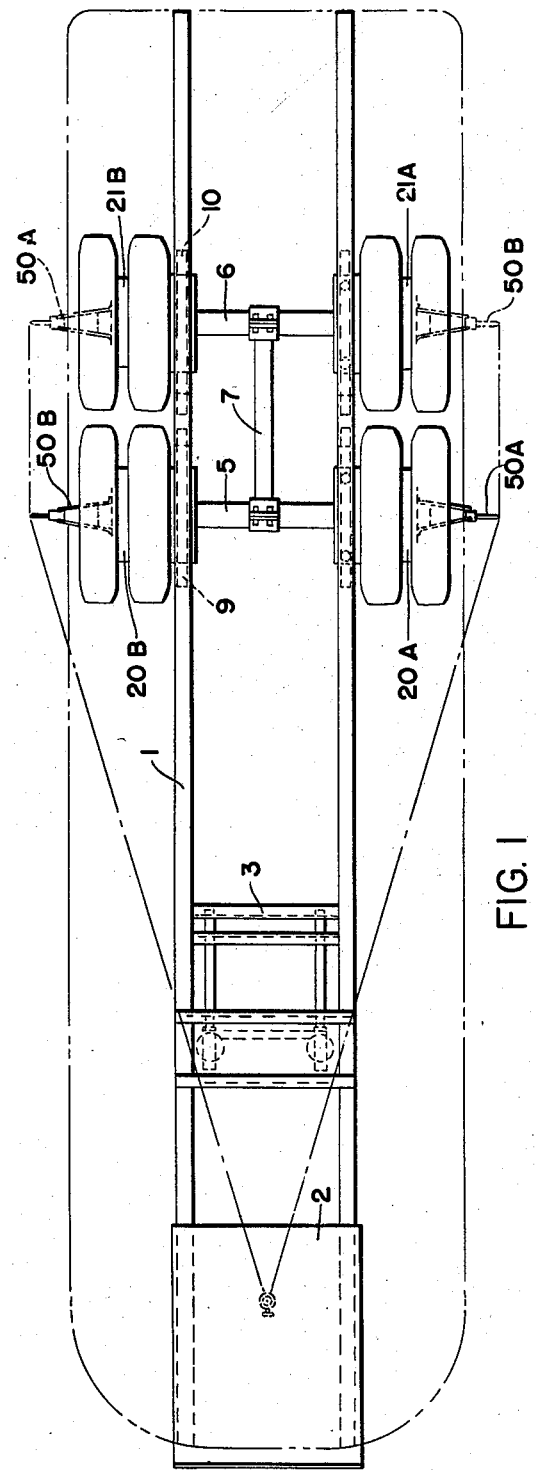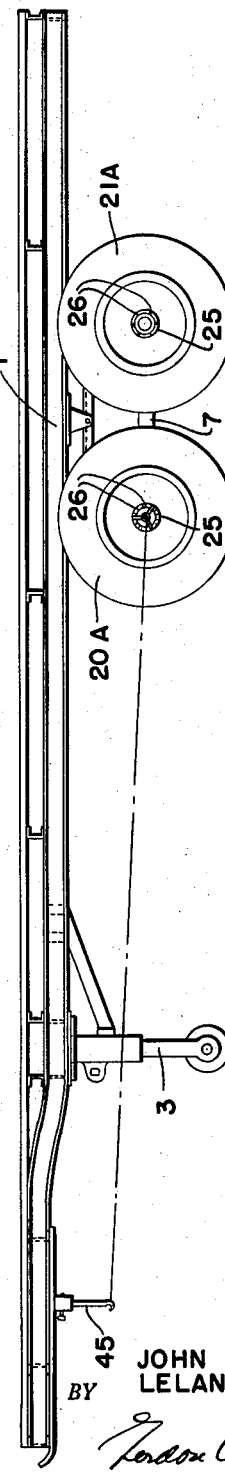
FIG. 1
FIG. 2
INVENTORS.
JOHN F. BROWN
LELAND O. HUGHES
BY
*Gordon C. Mark*
ATTORNEY March 17, 1959  J. F. BROWN ET AL  2,877,560
ALIGNMENT OF THE AXLES OF TRAILERS
Filed Sept. 28, 1955  3 Sheets-Sheet 2

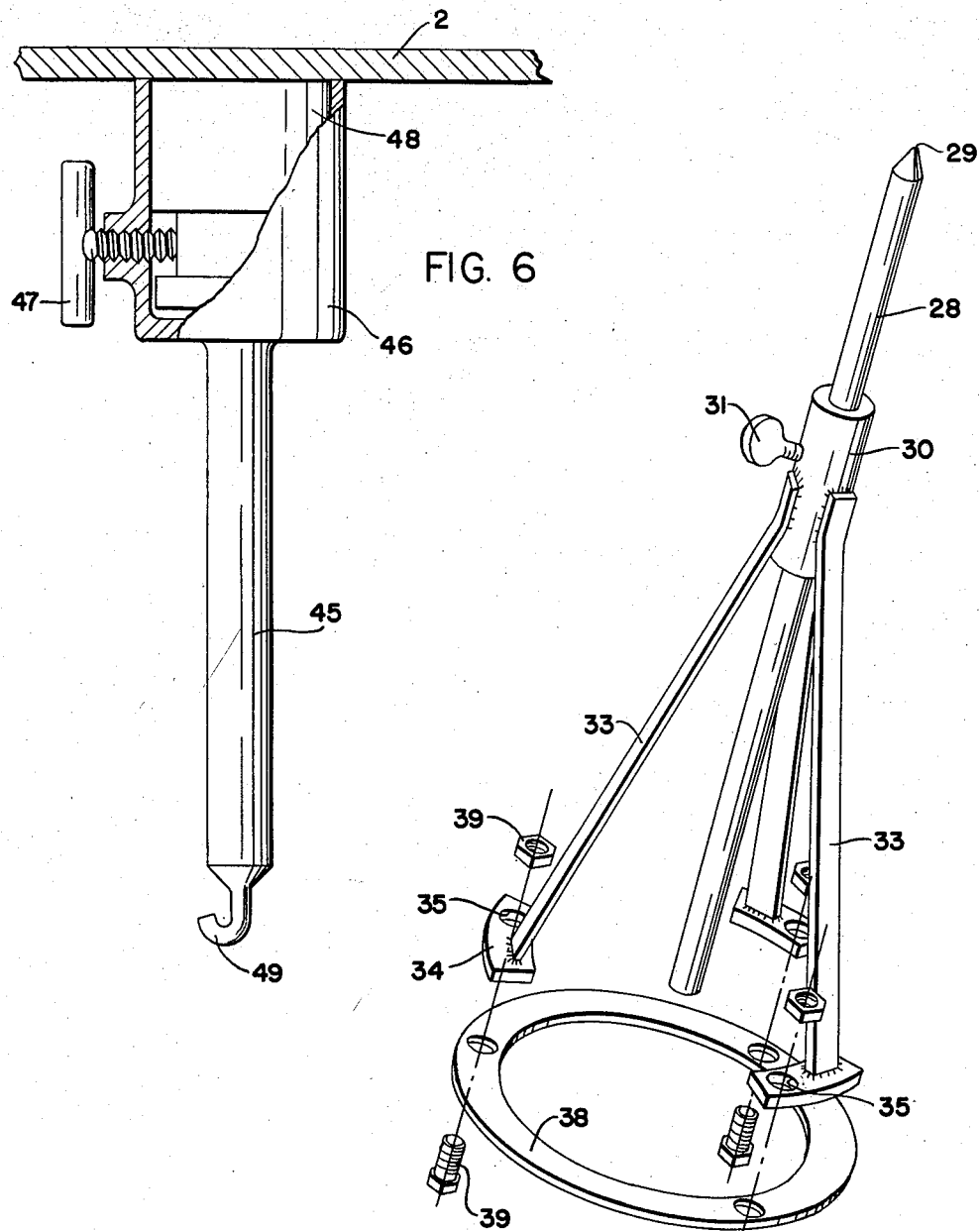

United States Patent Office 2,877,560
Patented Mar. 17, 1959

2,877,560

ALIGNMENT OF THE AXLES OF TRAILERS

John F. Brown, Cuyahoga Falls, and Leland O. Hughes, Akron, Ohio, assignors, by direct and mesne assignments, to Triplex Trailiner Tool Company, Akron, Ohio, a corporation of Ohio Application September 28, 1955, Serial No. 537,116

8 Claims. (Cl. 33—193)

This invention relates to aligning the axles of trailers. More particularly, it relates to devices to be attached to the two ends of the axle of a trailer which are to be used in combination with a different device adapted to be fastened to the kingpin of the trailer.

When the wheels of vehicles are not properly aligned, the tires on them do not wear evenly. The uneven wear shortens the life of the tires. It is, therefore, the practice for owners of trailers to have their axles aligned at more or less frequent intervals.

Heretofore it has been necessary to remove trailer hub caps to measure axle alignment. And since the recent introduction of wheel bearing oil seals on the market (which employ oil instead of heavy grease as a lubricant) it is undesirable to remove the hub caps unnecessarily for the following reasons: (1) Loss of time removing and replacing caps, (2) removing hub cap breaks the lubricant seal with consequent loss of lubricant, which must be replaced, (3) removing hub caps can allow dirt or foreign matter to enter the lubricant chamber.

The aligning aids to which this invention relates more particularly, are adapted to be fastened right over the hub cap at the ends of an axle so that the measurements necessary to determine whether the axle is properly aligned may be made without removing these caps. This is particularly advantageous if the bearings are lubricated with a liquid lubricant.

The invention includes an improved kingpin extender which includes means for attaching a measuring tape to an extension of the axis of the kingpin.

The invention is further described in connection with the accompanying drawings, in which—

Fig. 1 is a top plan view of a trailer with the frame assembly shown in full lines and the upper part in dot-dash lines;

Fig. 2 is a side elevation of the frame of the trailer and the frame support;

Fig. 6 is a view, partly broken away, of the kingpin extender; and

Fig. 7 is a view in perspective of the principal alignment aid, largely disassembled.

Figure 3:
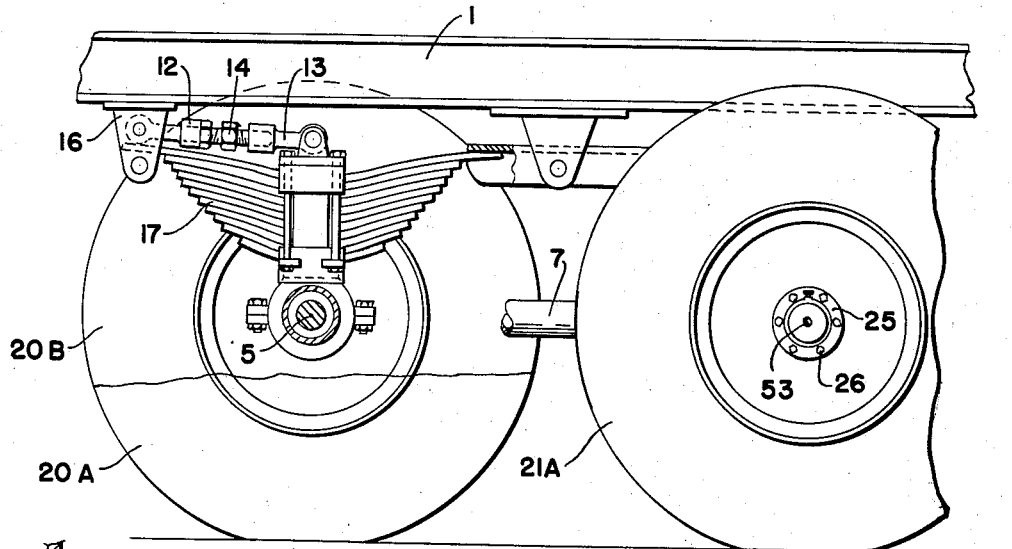
Fig. 3 is a detail showing how the frame of the trailer is adjustably supported on the axle.
Figure 4:
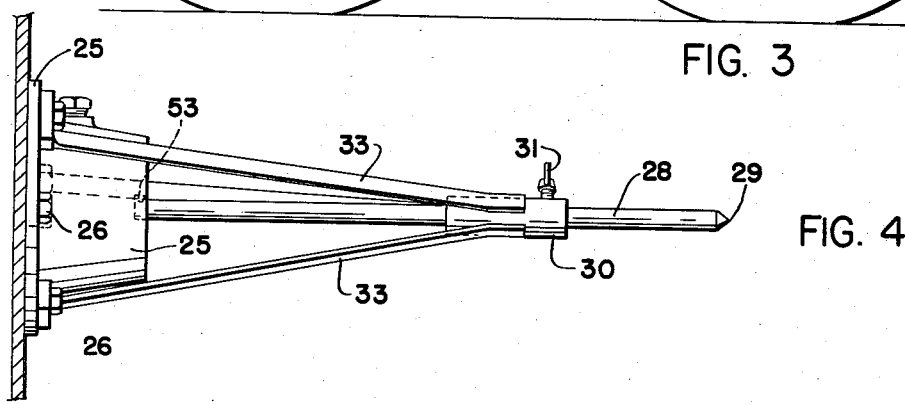
Fig. 4 is an elevation of a principal alignment aid fastened to the hub cap taken on the line 4—4 of Fig. 5.

The trailer which is shown in the drawings is merely illustrative of the trailer constructions to which the alignment aids of this invention are applicable. The frame 1 extends substantially the entire length of the trailer. At the front is the slide plate 2 which facilitates the sliding of the trailer on to a tractor. The front support 3, usually retractable, is of any usual design.

The drawings illustrate a tractor with a double rear axle and two wheels and four tires on each axle. The alignment aid is equally applicable to single axles and to axles with only two wheels and two tires, provided only that the ends of the axle are equipped with hub caps with depressed centers, and these hub caps are of the same design on the same axle.

The drawings show a trailer with a front rear axle 5 and a hind rear axle 6 (herein called the front and rear axles, respectively, as is the custom in the industry). These axles are connected by the usual telescoping connector 7. At one side of the frame (which is the far side in Figs. 2 and 3) the axles are fastened to the frame by the usual non-adjustable means 9 and 10. On the near side, the two axles are fastened to the frame by two three-part adjustable couplings (only one being shown, both being identical but attached to the frame at their opposite ends). Each includes front and rear portions 12 and 13, and a central portion 14. This central portion 14 includes a double screw with a hexagonal head at the center. By turning this screw in one direction the parts 12 and 13 are brought nearer together, and by turning it in the opposite direction these parts are separated. The forward portion of the front adjustable coupling is pivoted to the bracket 16. As illustrated, the frame is supported on leaf springs 17 which rest on the axle.

Tires are mounted on the four dual wheels, and these wheels are designated herein as follows: The front wheels are designated 20A and 20B, and the rear wheels are designated 21A and 21B. (In Fig. 3 these identifying designations are used to refer to the tires instead of to the wheels.)

There are several designs of bearing seal kits now on the market, but they are all standard in several respects. All hub caps are bolted to the wheel hubs by six hexagonal bolts in a circle of prescribed radius (except for the relatively few trailers where three bolts are required), and all of the hub caps are depressed at their centers. In the drawings, the hub caps are designated by the reference numeral 25, and the bolts by the numerals 26.

The alignment aid includes the adjustable rod 28 which is preferably pointed at 29 at its outer end in order to provide for accurate measurements. This rod is slidably supported in the collar 30 which is provided with the setscrew 31 for tightening the rod at any position in the collar. The collar is supported by the three supporting members 33 which form a tripod. If hub caps with bolt holes 26 in multiples of four (instead of multiples of three) were ever encountered, the alignment aid can be made with four members 33. At the base of each of these members is a plate 34 with a bolt hole 35 in it. These bolt holes 35 are spaced to coincide with alternate bolt holes in the hub cap.

The rods 28 are adjustably held in the alignment aid so that when the members 33 have been bolted to the hub cap the inner end of the rod can be centered in the depression in the center of the hub cap and fastened with its inner end against the bottom of the depression. It is presumed that identical hub caps are used on both ends of any given axle. By centering the adjustable rod in the depression at the center of a hub cap, coincident with the center of an axle, and supporting the collar 30 by members of the same length, and thereby centering it, the rod is brought into concentric relation with the axle. The points 29 of the alignment aids on the opposite ends of an axle, are therefore both concentric with the axle and the same distance from its opposite ends, the rods 28 in both alignment aids being the same length. It follows that the axle is in alignment if these points are both the same distance from the kingpin which is on the centerline of the trailer. If the points are different distances from the kingpin, the axle is out of alignment.

Figure 7 illustrates the alignment aid as provided with a removable base ring 38, and bolts and nuts 39 for fastening the plates 34 to the base ring. The alignment aid is preferably fastened to this base ring by these nuts and bolts when it is not in use. This prevents distortion of the members 33 which would make alignment measurements inaccurate.

Figure 5:
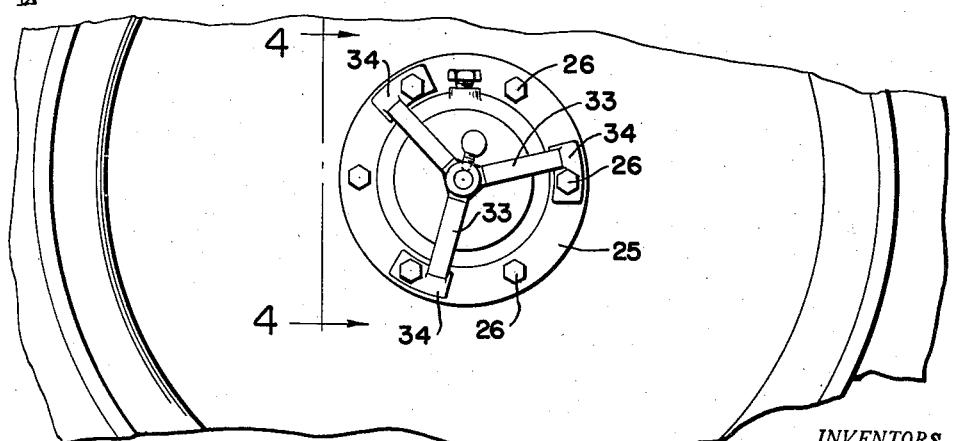
Fig. 5 is a view of the alignment aid assembled on the hub cap.

As shown in Fig. 5, when the alignment aid is used it is removed from the base ring 38 and the plates 34 are fastened directly to the hub cap at the alternate bolt holes. The bolts 26 which are used for fastening the cap to the wheel are now used for fastening the alignment aid to the wheel.

In addition to the alignment aid which has been described and called the principal alignment aid, a kingpin extender 45 such as is illustrated in detail in Fig. 6 is advantageously used. This includes a cup portion 46 and a setscrew 47 to fasten the cup in position over the kingpin 48 of the trailer. At the lower end of the extender is a hook 49. It is noted that the hook 49 and setscrew 47 are aligned with one another. In making a measurement the hook is turned forwardly. The setscrew 47 is tightened on the kingpin. If the setscrew were at the side of the cup 46 instead of being aligned with the hook (at the front or rear), tightening the setscrew would throw the extension 45 out of alignment so that the hook 49 would not be in line with the axis of the kingpin.

In testing the alignment of the axles a conventional 50-ft. measuring tape is employed. This may be composed of cloth, steel, or any suitable material. It may be flat or a wire. It is provided at one end with a loop which is slipped on the hook 49 of the extender 45. The tape may be calibrated into inches or the like, but this is not necessary.

Two identical alignment aids 50A and 50B are used on the respective ends of the axle. The front axle will be checked first. One alignment aid is bolted against the hub cap at each end of this front axle. The setscrew 31 of each is loose when the aids are put in place. The adjustable rod 28 is then moved into position with its inner end seated in the depression 53 in the center of the hub cap at that end of the axle. The setscrew 31 is then tightened.

The distance from the kingpin extender to the point 29 at the end of one of the two alignment aids, for example the alignment aid 50A at one end of the front axle, is first determined. Then the distance from the kingpin to the point 29 of the alignment aid 50B at the opposite end of this front axle is determined. If the two distances check it is known that the axle is aligned. If they do not check, the nut 14 of the axle adjuster is turned one way or the other until the distance from the kingpin to the two alignment points is the same.

After the front axle has been aligned the rear axle will be aligned. Although it would be possible to simply shift the alignment aids, if they were long enough, to the rear axle and make a similar determination, this is not generally done. The alignment aid from one side of the trailer is fastened to the free hub cap at the other side, and the distance between the two is determined. Ordinarily it will be desirable to first measure the distance between the two axles on the side of the trailer where the axles are non-adjustably fastened to the frame. Thus the alignment aid 50A is transferred from the end of the axle on the near side of the trailer to the far side of the rear axle. The distance between the two points of the two alignment aids is then determined with the tape. The two alignment aids are then transferred to the other side of the truck, and the distance between the points is again measured. If the distance between the alignment aids on the two sides of the trailer are not the same the central portion 14 of the rear adjustable coupling is turned to bring the two into alignment. This is usually done by halving the difference in the two distances between the points 29 when located on the opposite sides of the trailer (disregarding the minor change this makes in the first-measured distance).

The drawings are illustrative, and modifications may be made in the structure. For instance, the collar may be supported by four or more members. These supporting members, whatever their number, may be pivotally attached to the collar, instead of being rigidly attached. Also, other methods of aligning the axles may be used.

The invention is covered in the claims.

What we claim is:

1. In combination with a trailer having a kingpin at the center of the front for attachment to a tractor, an axle having hub caps bolted in place on both ends thereof, and a depression in the outer face of each hub cap which depression is concentric with the center of the axle, a support extending axially from each end of the axle and held thereto by bolts extending through holes in the respective hub caps and screwed into holes in the wheel hubs intended to receive hub cap bolts, means slidable axially of each support and means on each support for releasably fastening each said slidable means when its inner end is in the depression in the hub cap at that end of the axle, whereby by measurement from the kingpin to positions on the axially slidable means it can be determined whether said axle is properly aligned.

2. In combination with a trailer having a kingpin at the center of the front for attachment to a tractor, an axle having hub caps bolted in place on both ends thereof, and a depression in the outer face of each hub cap which depression is concentric with the axis of the axle, means on the kingpin for attaching one end of a measuring tape releasably axially of the kingpin a support extending from each end of the axle and held thereto by independent members bolted through holes in the respective hub caps into bolt holes intended to receive hub cap bolts, and means slidable axially of each support with means on each support for releasably fastening each said slidable means when its inner end is in the depression in the hub cap at that end of the axle, whereby by measurement from the kingpin to positions on the axially slidable means it can be determined whether said axle is properly aligned.

3. In combination with a trailer having a kingpin at the center of the front for attachment to a tractor, an axle having hub caps bolted in place on the respective ends thereof, a depression in the outer surface of each hub cap which is concentric with the axle, means on the kingpin for releasably engaging one end of a measuring tape axially of the kingpin, collars concentric with the axle, members held by bolts which pass through holes in the respective hub caps and are threaded in bolt holes in the wheel hubs intended for bolting the respective hub caps thereto, said collars being supported by said members, rods of the same length being slidably held in said collars with the inner end of each rod centered in the depression in the respective hub cap, and setscrews which pass through the collars and hold said rods in position, whereby measurement of the distance from the kingpin to the outer ends of the respective rods can readily be made by a measuring tape in alignment of the axle.

4. A device for use in measuring the alignment of an axle of a trailer by determining the distance from a point located axially of the kingpin of the trailer to the pointed outer end of slidable means comprised in the device, which device includes said pointed slidable means, a support therefor which includes a bearing for the slidable means, and independent members which flare outwardly from the bearing and are provided at their respective free ends with a hole adapted to receive a bolt, said holes being located in a circle.

5. A device for use in measuring the alignment of the rear axle of a trailer over the hub cap thereof which hub cap has a depression in its center by determining the distance from a point located axially of the kingpin of the trailer to the pointed outer end of slidable means comprised in the device, which device includes said pointed slidable means, a substantially conical support with an axial bearing near its apex in which bearing said slidable means is adapted to slide, releasable means in the bearing for tightening the slidable means therein, and holes at the base of the support adapted to coincide with several bolt holes provided in the wheel hubs for the attachment of a hub cap thereto, there being an opening in the base of the support to permit the inner end of the slidable means to be located in the depression in the hub cap when the device is positioned over a hub cap.

6. A device for use in measuring the alignment of the rear axle of a trailer, which device comprises three supporting members, a collar supported thereby, a rod adapted to slide in the collar, a setscrew through the wall of the collar which is adapted to be turned against the rod, and a member provided with holes arranged in a circle to which the free ends of the supporting members are temporarily bolted.

7. A device for use in measuring the alignment of the rear axle of a trailer, which device comprises three supporting members, a collar supported thereby, a rod adapted to slide in the collar, a setscrew through the wall of the collar which is adapted to be turned against the rod, and a bolt hole in the free end of each supporting member adapted to coincide with one of the holes in which the bolts which hold the hub cap to the wheel are adapted to be screwed, said members angling outwardly from the collar in the general form of a cone.

8. In combination with a trailer having a kingpin at the center of the front for attachment to a tractor, and an axle having hub caps bolted in place on both ends thereof, a support extending axially from each end of the axle with a measuring point located outwardly on each support and movable with respect thereto adapted for measurement therefrom to the kingpin alignment of the axle, the distances between said respective points and the hub caps at the ends of the axles being the same, said supports being bolted to the respective ends of the axle with bolts extending through holes in the hub caps and screwed into bolt holes intended to receive hub-cap bolts, and means permitting axial alignment of said measuring points with the axle.

References Cited in the file of this patent
UNITED STATES PATENTS

| | | |
|---|---|---|
| 1,647,864 | Halphen | Nov. 1, 1927 |
| 2,438,358 | Castiglia | Mar. 23, 1948 |
| 2,479,723 | Brown | Aug. 23, 1949 |
| 2,590,722 | Otis | Mar. 25, 1952 |
| 2,632,256 | Will | Mar. 24, 1953 |

UNITED STATES PATENT OFFICE
CERTIFICATE OF CORRECTION

Patent No. 2,877,560 March 17, 1959

John F. Brown et al.

It is hereby certified that error appears in the printed specification of the above numbered patent requiring correction and that the said Letters Patent should read as corrected below.

Column 6, line 11, after "kingpin" insert -- in --.

Signed and sealed this 30th day of June 1959.

(SEAL)
Attest:

KARL H. AXLINE
Attesting Officer

ROBERT C. WATSON
Commissioner of Patents